United States Patent
Zagacki

(10) Patent No.: US 7,913,099 B2
(45) Date of Patent: *Mar. 22, 2011

(54) DYNAMIC PROCESSOR OPERATING VOLTAGE CONTROL IN RESPONSE TO A CHANGE IN A CORE/BUS CLOCK FREQUENCY RATIO

(75) Inventor: Paul Zagacki, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 772 days.

This patent is subject to a terminal disclaimer.

(21) Appl. No.: 11/890,931

(22) Filed: Aug. 8, 2007

(65) Prior Publication Data

US 2007/0283177 A1    Dec. 6, 2007

Related U.S. Application Data

(63) Continuation of application No. 10/966,701, filed on Oct. 15, 2004, now Pat. No. 7,308,590.

(51) Int. Cl.
*G06F 1/00* (2006.01)
*G06F 1/26* (2006.01)
*G06F 1/32* (2006.01)
*F02P 3/02* (2006.01)

(52) U.S. Cl. ......... 713/300; 713/320; 713/322; 323/371

(58) Field of Classification Search .......... 713/300, 713/320, 322; 323/371
See application file for complete search history.

(56) References Cited

U.S. PATENT DOCUMENTS

| | | | | |
|---|---|---|---|---|
| 5,760,636 A | * | 6/1998 | Noble et al. | 327/513 |
| 6,385,735 B1 | | 5/2002 | Wilson et al. | 713/501 |
| 6,442,700 B1 | | 8/2002 | Cooper | 713/320 |
| 6,457,135 B1 | | 9/2002 | Cooper | 713/323 |
| 6,601,179 B1 | | 7/2003 | Jackson et al. | 713/322 |
| 6,721,892 B1 | * | 4/2004 | Osborn et al. | 713/300 |
| 6,823,516 B1 | | 11/2004 | Cooper | 718/108 |
| 6,889,331 B2 | * | 5/2005 | Soerensen et al. | 713/320 |
| 6,889,332 B2 | | 5/2005 | Helms et al. | 713/322 |
| 6,996,730 B2 | * | 2/2006 | Bonnett | 713/322 |
| 7,032,116 B2 | | 4/2006 | Cooper | 713/300 |
| 7,100,041 B2 | | 8/2006 | Garnett | 713/100 |
| 7,111,178 B2 | | 9/2006 | Rusu et al. | 713/300 |
| 7,444,524 B2 | * | 10/2008 | Gunther et al. | 713/300 |
| 7,562,233 B1 | * | 7/2009 | Sheng et al. | 713/300 |
| 2005/0091548 A1 | * | 4/2005 | George et al. | 713/320 |
| 2005/0138444 A1 | * | 6/2005 | Gaskins | 713/300 |

\* cited by examiner

*Primary Examiner* — Ji H Bae
(74) *Attorney, Agent, or Firm* — Trop, Pruner & Hu, P.C.

(57) ABSTRACT

A technique to adjust a processor's operating voltage dynamically while preventing a user from placing the processor into a harmful operating voltage state in relation to the core/bus frequency ratio of the processor. More particularly, embodiments of the invention relate to a technique to control the operating voltage of the processor as a function of the processor's bus and/or core clock frequency.

18 Claims, 4 Drawing Sheets

DYNAMIC PROCESSOR OPERATING VOLTAGE CONTROL IN RESPONSE TO A CHANGE IN A CORE/BUS CLOCK FREQUENCY RATIO

This application is a continuation of U.S. patent application Ser. No. 10/966,701 filed Oct. 15, 2004, now U.S. Pat. No. 7,308,590, entitled "Automatic Dynamic Processor Operating Voltage Control," the content of which is hereby incorporated by reference.

BACKGROUND

Embodiments of the invention relate to microprocessors and microprocessor systems. More particularly, embodiments of the invention relate to dynamically controlling an operating voltage of a microprocessor based on the processor core/bus frequency.

In some microprocessors, an operating voltage can be adjusted according to a processor's core clock speed, the speed of the external bus over which the processor communicates with other devices within a computer system (hereafter "bus"), or some mathematical combination of both the core clock and the bus clock speed (e.g., a ratio or a product). In some computer systems, the bus is known as a "front side bus", while in other computer systems, such as within a point-to-point interconnect, the bus is known as a "link".

Prior art techniques of adjusting processor operating voltage as a function of the bus and/or core frequency have relied on the operating system and/or the basic input/output software (BIOS) to set the operating voltage, usually via a machine specific register. For example, at least one prior art implementation involves generating a table of allowable operating voltages and bus/core frequency ratio pairs either in hardware or system memory and adjusting the processor's power supply according to the table.

Unfortunately, these prior art techniques allow a user to modify the operating voltage and/or bus and/or core clock frequencies independently, which can result in operating voltage and core/bus frequency combinations that can harm or otherwise cause unreliable operation of the processor.

DETAILED DESCRIPTION

Embodiments of the invention relate power control within a microprocessor. More particularly, embodiments of the invention relate to a technique to control the operating voltage of the processor as a function of the processor's bus and/or core clock frequency.

Embodiments of the invention calculate and adjust a processor's operating voltage in response to a change in the processor's core and/or bus clock frequency. Furthermore, embodiments of the invention adjust the processor's operating voltage automatically, in that the processor can set the appropriate operating voltage in response to a change in core and/or bus frequency without the user having to change the operating voltage. One embodiment of the invention calculates and adjusts a processor's operating voltage according a change in the processor's bus/core frequency ratio (R). Furthermore, at least one embodiment adjusts a processor's operating voltage according to an operating voltage value, "Vid", determined from a curve between a minimum allowable operating voltage/R point and a maximum allowable operating voltage/R point.

Although some embodiments discussed herein with reference to specific drawings illustrate how an operating voltage of a processor can vary according to a processor core/bus frequency ratio, other embodiments may vary the processor's operating voltage according to only the processor's core frequency. Furthermore, other embodiments may vary the processor's operating voltage according to the bus frequency, while other embodiments may vary the operating voltage according to some other mathematical combination of the core and bus frequency (e.g., product).

Figure 1:
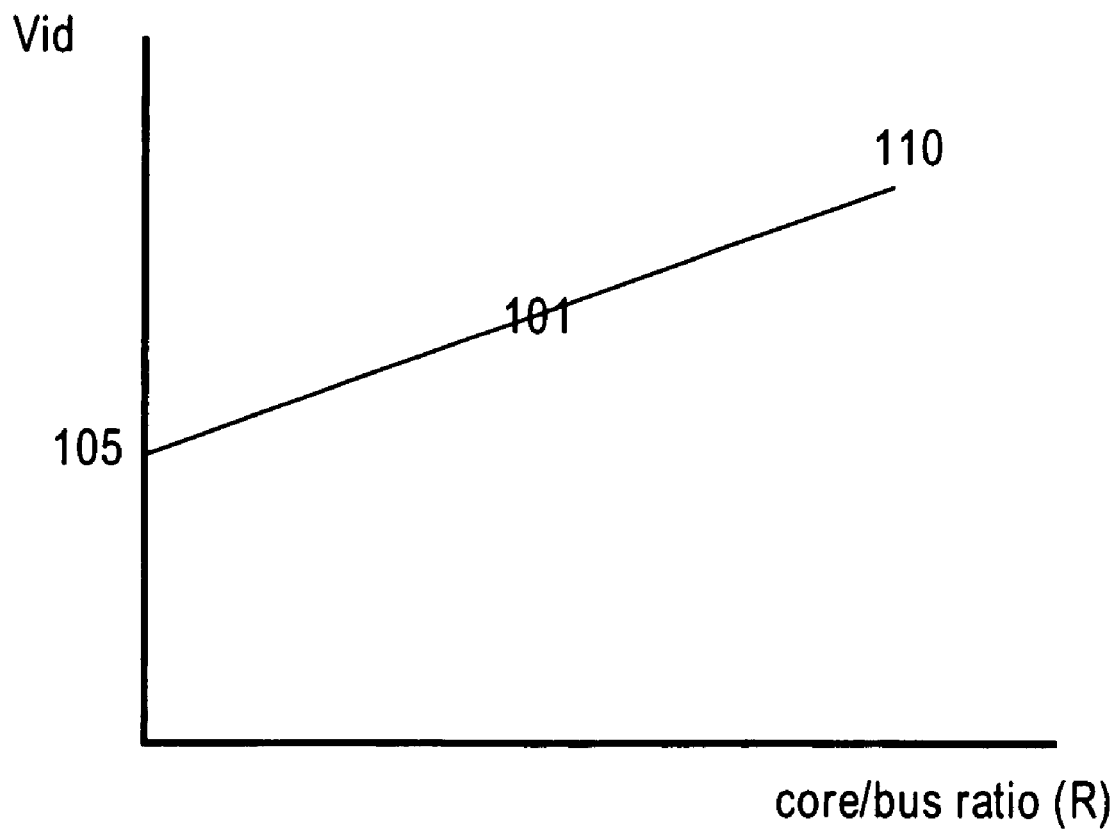
FIG. 1 is a graph illustrating operating voltage of a processor as a function of the processor's bus/core frequency ratio in accordance with one embodiment of the invention.

FIG. 1 is a graph illustrating a processor's operating voltage, Vid, as a function of the core/bus frequency ratio, R. In one embodiment of the invention, the appropriate Vid in FIG. 1 is calculated for a given R value by determining the slope and the y-axis intercept 105 of the curve 101. The y-axis intercept corresponds to the minimum allowable operating voltage for the processor, which may be different among various processors. The slope of the curve in FIG. 1 is calculated, in at least one embodiment, by dividing the Vid range by the core/bus ratio range. The Vid range is the difference between the minimum allowable operating voltage for the processor, corresponding to the minimum allowable core/bus frequency ratio, and the maximum allowable voltage range for the processor, corresponding to the maximum allowable core/bus frequency ratio 110.

Once the slope of the curve of FIG. 1 has been calculated, any operating voltage, Vid, may be calculated from a given core/bus frequency ratio according to the linear equation: Vid=mR+VidMin, where m is the slope of the curve, R is a point on the x-axis corresponding to a particular core/bus ratio, and VidMin is the minimum allowable operating voltage of the processor, corresponding to the y-axis intercept in FIG. 1.

Any operating voltage, Vid, may be determined given a core/bus ratio, R, from the curve in FIG. 1. In one embodiment, the operating voltage can change dynamically, that is throughout the operation of the processor without re-booting the processor, whenever there is a change in R. A dynamic change in the operating voltage can be facilitated in one embodiment of the invention by detecting a change in the core/bus frequency ratio, and calculating a new value of Vid according to the curve of FIG. 1. Furthermore, the Vid may be selected automatically by the processor by configuring only the processor core/bus frequency ratio, rather then requiring the operating system or BIOS to write both the core/bus frequency ratio and the Vid values to a machine specific register, as in the prior art. In this way, the operating voltage of the processor not only changes dynamically, but more securely than in the prior art, as users may not put the processor in a Vid/R combination that could damage or otherwise cause unreliable operation of the processor.

Typically, the maximum and minimum allowable core/bus frequency ratios are detectable through a corresponding binary value stored within the processor. Furthermore, a core/bus frequency ratio at which a processor is operating can be detected by reading a corresponding value in a machine register, such as a machine-specific register (MSR). However, the resulting Vid need not be written to an MSR, but instead the Vid may be calculated automatically by the processor and the resulting value used to configure the processor power supply controller, thereby avoiding exposure and availability to user direct modification of the Vid.

The operating voltage corresponding to a particular core/bus frequency ratio can be calculated in one embodiment, according to a curve like the one in FIG. 1, via micro-architectural computer-readable instructions within the processor, commonly known as "micro-code". Furthermore, in other embodiments, Vid calculations can be performed by processor logic, or a combination of processor logic and micro-code. In other embodiments, other software besides micro-code may be used to make these calculations, depending on the needs of the system.

Figure 2:
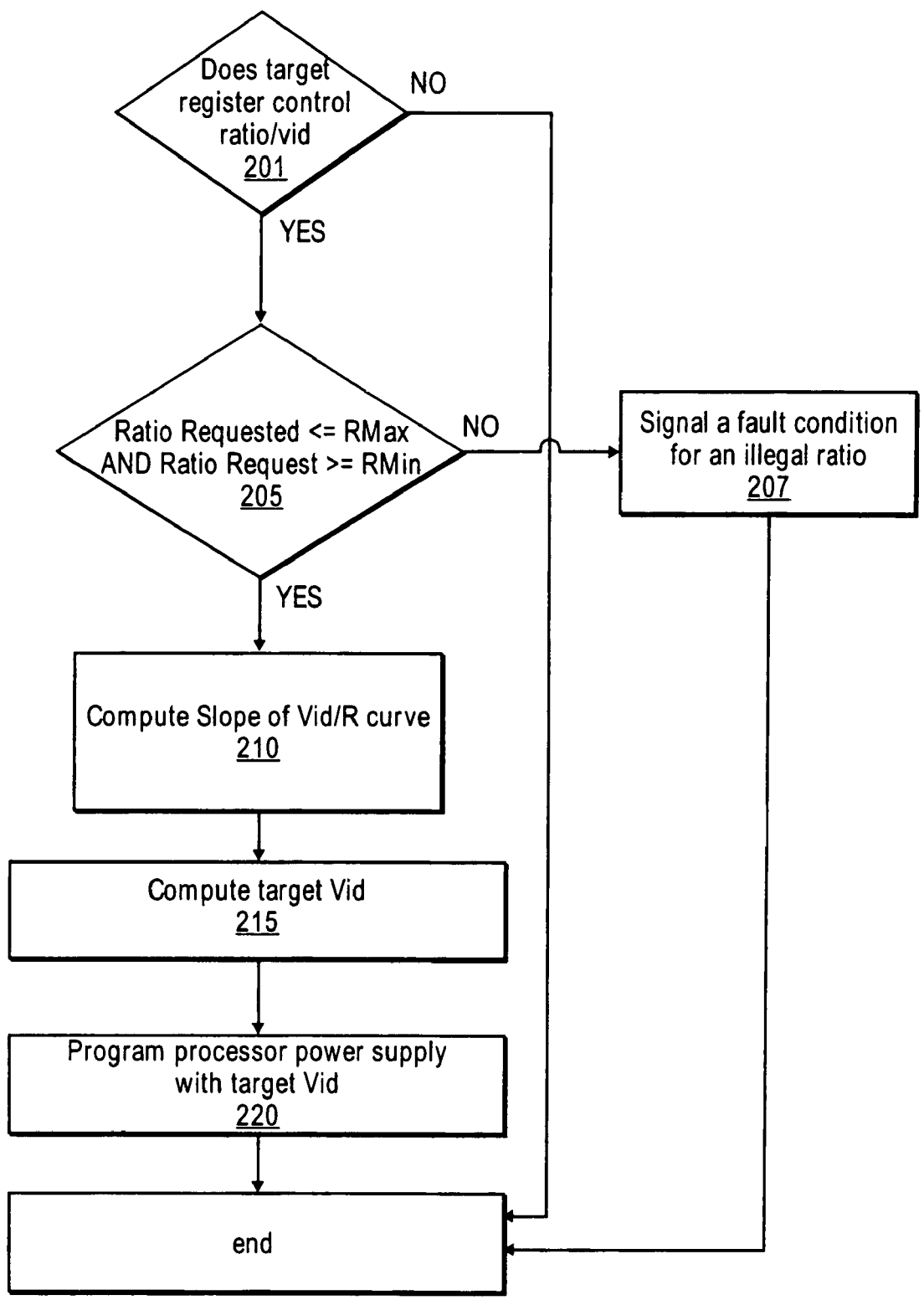
FIG. 2 is a flow diagram illustrating operations used in at least one embodiment of the invention.

FIG. 2 is a flow diagram illustrating operations, according to one embodiment of the invention. In FIG. 2, processor logic controlling processor state transitions or software, such as micro-code, can be used to change the operating voltage and core/bus frequency ratio of the processor. For example, at operation 201, it is determined whether a command, such as one that writes a value to an MSR register, is intended for a machine register controlling the operating voltage and/or core/bus frequency ratio of the processor. If so, it is then determined whether the core/bus ratio requested is within the allowable range for the processor at operation 205. If not, a fault condition is indicated at operation 207. If so, the slope of the Vid/R curve, illustrated by way of example in FIG. 1, can be calculated at operation 210, thereby enabling the target Vid, corresponding to the requested core/bus ratio, to be calculated at operation 215. The target Vid may then be used to program the processor's variable power supply at operation 220.

Figure 3:
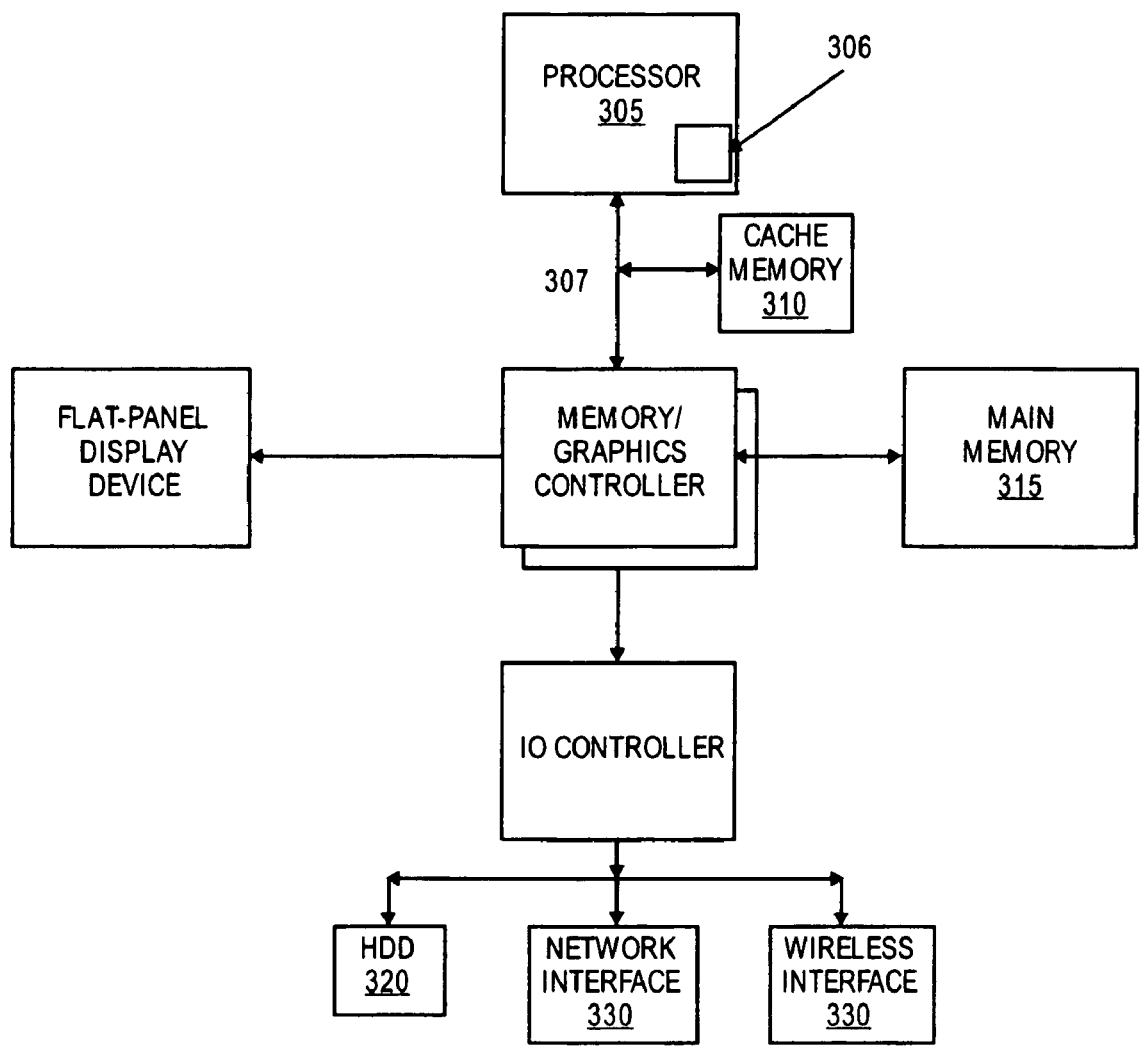
FIG. 3 is a front-side-bus computer system in which at least one embodiment of the invention may be implemented.

FIG. 3 illustrates a front-side-bus (FSB) computer system in which one embodiment of the invention may be used. A processor 305 accesses data from a level one (L1) cache memory 310 and main memory 315. In other embodiments of the invention, the cache memory may be a level two (L2) cache or other memory within a computer system memory hierarchy. Furthermore, in some embodiments, the computer system of FIG. 3 may contain both a L1 cache and an L2 cache, which comprise an inclusive cache hierarchy in which coherency data is shared between the L1 and L2 caches.

Illustrated within the processor of FIG. 3 is one embodiment of the invention 306. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 320, or a memory source located remotely from the computer system via network interface 330 containing various storage devices and technologies. The cache memory may be located either within the processor or in close proximity to the processor, such as on the processor's local bus 307. Furthermore, the cache memory may contain relatively fast memory cells, such as a six-transistor (6T) cell, or other memory cell of approximately equal or faster access speed.

The computer system of FIG. 3 may be a point-to-point (PtP) network of bus agents, such as microprocessors, that communicate via bus signals dedicated to each agent on the PtP network. Within, or at least associated with, each bus agent is at least one embodiment of invention 306, such that store operations can be facilitated in an expeditious manner between the bus agents.

Figure 4:
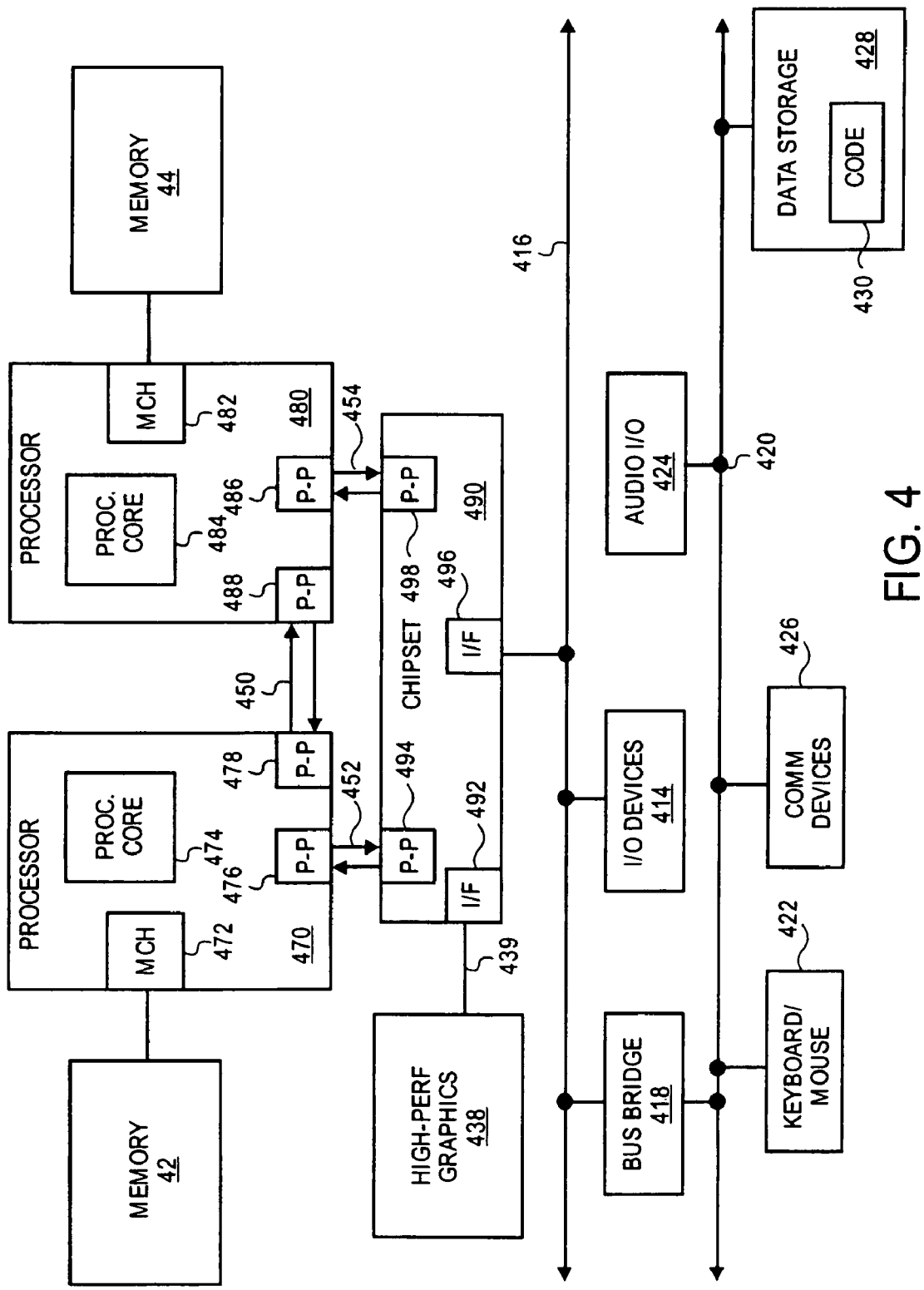
FIG. 4 illustrates a point-to-point (p2p) computer system in which one embodiment of the invention may be used.

FIG. 4 illustrates a computer system that is arranged in a point-to-point (PtP) configuration. In particular, FIG. 4 shows a system where processors, memory, and input/output devices are interconnected by a number of point-to-point interfaces.

The system of FIG. 4 may also include several processors, of which only two, processors 470, 480 are shown for clarity. Processors 470, 480 may each include a local memory controller hub (MCH) 472, 482 to connect with memory 42, 44. Processors 470, 480 may exchange data via a point-to-point (PtP) interface 450 using PtP interface circuits 478, 488. Processors 470, 480 may each exchange data with a chipset 490 via individual PtP interfaces 452, 454 using point to point interface circuits 476, 494, 486, 498. Chipset 490 may also exchange data with a high-performance graphics circuit 438 via a high-performance graphics interface 439.

At least one embodiment of the invention may be located within the PtP interface circuits within each of the PtP bus agents of FIG. 4. Other embodiments of the invention, however, may exist in other circuits, logic units, or devices within the system of FIG. 4. Furthermore, other embodiments of the invention may be distributed throughout several circuits, logic units, or devices illustrated in FIG. 4.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   calculation logic to determine a change in a core/bus ratio between a processor core clock frequency and a bus clock frequency, and to calculate an operating voltage responsive to the change in the core/bus ratio and to program a power supply with the calculated operating voltage, wherein the calculation logic is to prevent a user from adjusting the operating voltage independently of the processor core clock frequency and/or the bus clock frequency, and to calculate the operating voltage according to a linear equation, a variable of which is the core/bus ratio.

2. The apparatus of claim 1, wherein a slope of the linear equation is dependent upon a ratio of the difference between a maximum and minimum allowed core/bus ratio of the processor and the difference between a maximum and minimum allowed operating voltage of the processor.

3. The apparatus of claim 1, wherein the calculation logic is to calculate the operating voltage of the processor automatically a plurality of times and the processor is able to function at each operating voltage without the processor being rebooted.

4. The apparatus of claim 3, wherein the calculation logic includes micro-architectural instructions stored within the processor that are unavailable to a user, which when executed by the processor, cause calculation of the operating voltage in response to the determination of the change in the core/bus ratio.

5. The apparatus of claim 3, wherein the calculation logic is to provide the calculated operating voltage to the power supply without writing of the calculated operating voltage to a machine specific register.

6. The apparatus of claim 2, wherein the calculation logic is to determine whether the changed core/bus ratio is within an allowable range and, if not, to signal a fault condition.

7. A processor comprising:
  first logic to determine a core/bus ratio between a frequency at which a processor core clock is to be set and a bus frequency at which a bus coupled to the processor is to be set;
  second logic to calculate an operating voltage for the processor in response to the determination of the core/bus ratio by the first logic and to prevent a user from adjusting the operating voltage, the second logic to calculate the operating voltage according to a linear equation having a slope dependent upon a ratio regarding a maximum and minimum allowed core/bus ratio and a maximum and minimum allowed operating voltage.

8. The processor of claim 7, wherein the second logic is to calculate the operating voltage of the processor a plurality of times and the processor is able to function at each operating voltage without the processor being rebooted.

9. The processor of claim 8, wherein the second logic is to execute micro-architectural instructions stored within the processor that are unavailable to a user, which when executed by the second logic, cause the processor's operating voltage to be adjusted in response the first logic determining the core/bus ratio.

10. The processor of claim 7, wherein the second logic is to program a power supply with the operating voltage without using a user-available machine register.

11. The processor of claim 7, wherein the slope is dependent upon a ratio of the difference between a maximum and minimum allowed core/bus ratio of the processor and the difference between a maximum and minimum allowed operating voltage of the processor.

12. The processor of claim 7, further comprising logic to determine whether a changed core/bus ratio is within an allowable range and, if not, to signal a fault condition.

13. A system comprising:
  operating voltage calculation logic to calculate an operating voltage for a processor responsive to a change in a ratio between a bus/core frequency, wherein the operating voltage calculation logic is to determine a first ratio between an allowable operating voltage range and a bus/core frequency ratio range;
  a variable power supply to provide the operating voltage to the processor responsive to the calculation.

14. The system of claim 13, wherein the operating voltage calculation logic is to calculate the operating voltage based on a product of the first ratio and the bus/core frequency ratio, and a minimum allowable operating voltage for the processor.

15. The system of claim 13, wherein the operating voltage calculation logic is to program the variable power supply with the operating voltage without writing of an operating voltage value to a machine register of the processor.

16. The system of claim 15, wherein an operating system or a basic input/output system is to write a value of the core/bus ratio to the machine register and is not to write the operating voltage value to the machine register.

17. The system of claim 13, wherein a value of the operating voltage is not exposed to a user of the system.

18. The system of claim 13, further comprising the processor including the operating voltage calculation logic, the processor coupled to a memory.

* * * * *